United States Patent [19]

Ingwersen et al.

[11] Patent Number: 5,260,546
[45] Date of Patent: * Nov. 9, 1993

[54] GUN FOR GAS METAL ARC WELDING

[76] Inventors: John A. Ingwersen, 50 Thurman Ave., Columbus, Ohio 43206; Thomas D. Montague, 4711 High Vista Dr., Columbus, Ind. 47203; Robert G. Reed, R.R. #1, Box 427, Rd. 1000 W., Elizabethtown, Ind. 47232

[*] Notice: The portion of the term of this patent subsequent to Jul. 21, 2009 has been disclaimed.

[21] Appl. No.: 913,874

[22] Filed: Jul. 15, 1992

Related U.S. Application Data

[63] Continuation of Ser. No. 698,123, May 10, 1991, Pat. No. 5,132,513.

[51] Int. Cl.⁵ .................................. B23K 9/00
[52] U.S. Cl. .......................... 219/137.31; 219/137.9
[58] Field of Search ............... 219/137.31, 137.51, 219/137.9

[56] References Cited

U.S. PATENT DOCUMENTS

| | | | |
|---|---|---|---|
| 3,428,778 | 2/1969 | Blackman et al. | 219/137.31 |
| 3,689,733 | 9/1972 | Matasoyic | 219/137.31 |
| 3,783,233 | 1/1974 | dal Molin . | |
| 3,836,747 | 9/1974 | Wios . | |
| 4,072,828 | 2/1978 | Thome . | |
| 4,158,763 | 6/1979 | Moerke . | |
| 4,270,824 | 6/1981 | Erickson . | |
| 4,401,878 | 8/1983 | Roen . | |
| 4,403,136 | 9/1983 | Colman . | |
| 4,540,871 | 9/1985 | Corrigall et al. . | |
| 4,549,068 | 10/1985 | Kensrue | 219/137.31 |
| 4,695,702 | 9/1987 | Gartland . | |
| 4,727,238 | 2/1988 | Mann . | |
| 4,731,518 | 3/1988 | Parmelee . | |
| 5,132,513 | 7/1992 | Ingwersen et al. | 219/137.31 |

Primary Examiner—Clifford C. Shaw
Attorney, Agent, or Firm—Thomas S. Baker, Jr.

[57] ABSTRACT

A gas arc metal welding gun has a handle which may be rotated freely with respect to a conduit containing a current transfer wire and a gas tube and with respect to an adapter and tip assembly.

2 Claims, 4 Drawing Sheets

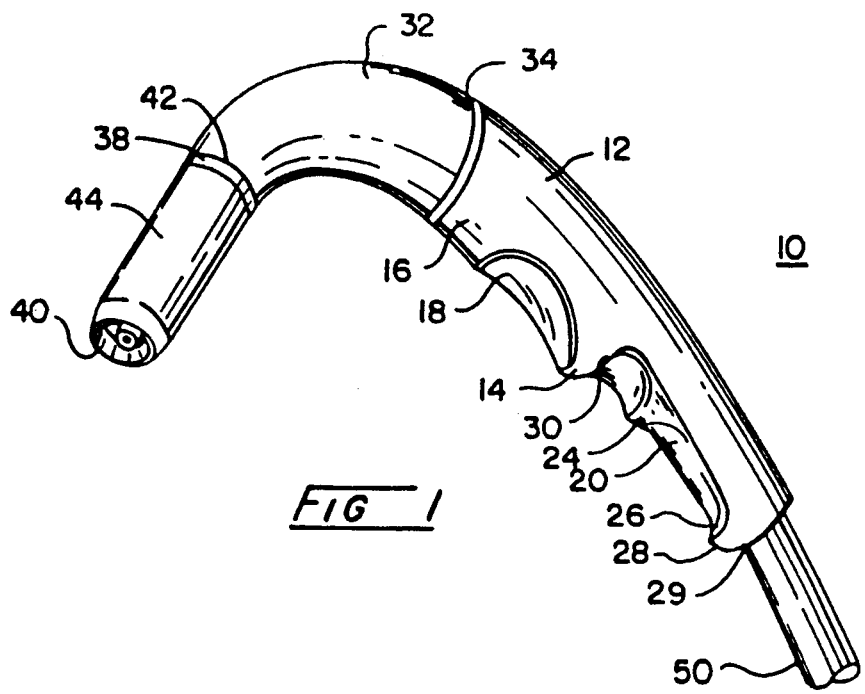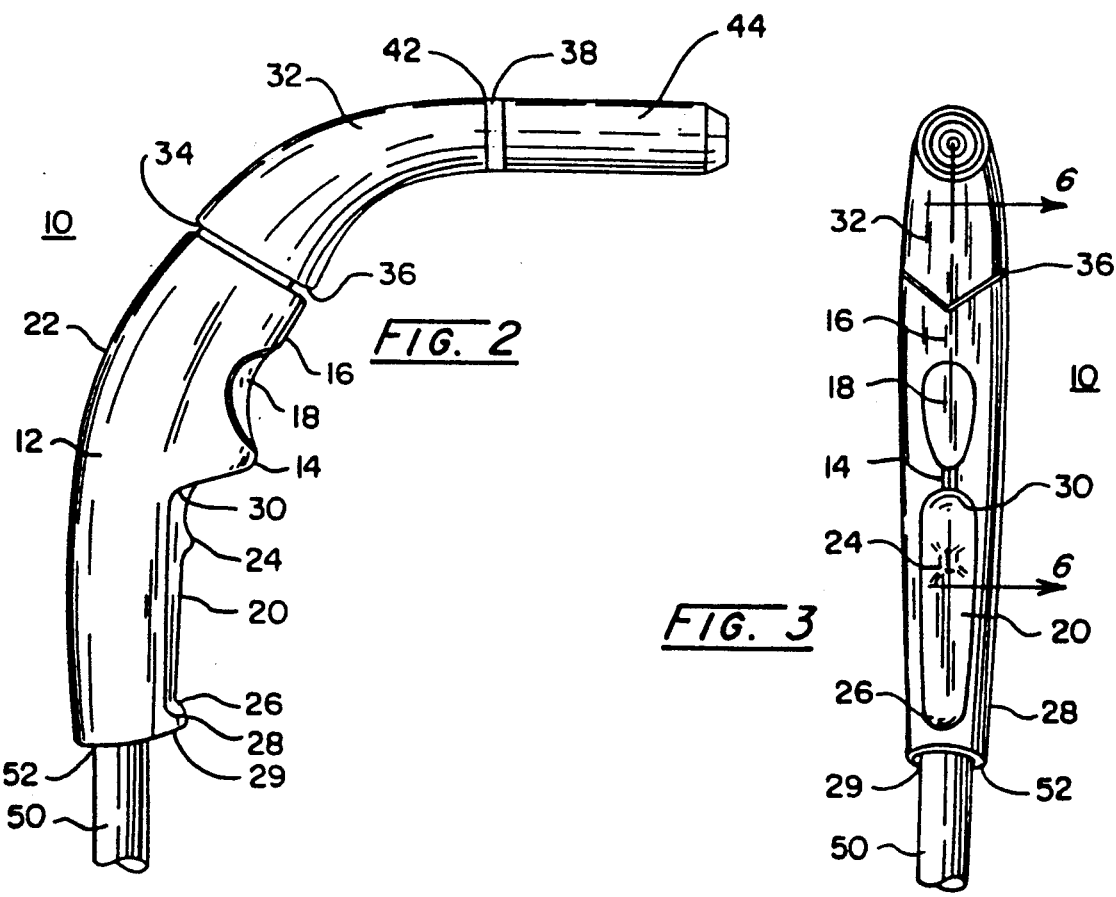

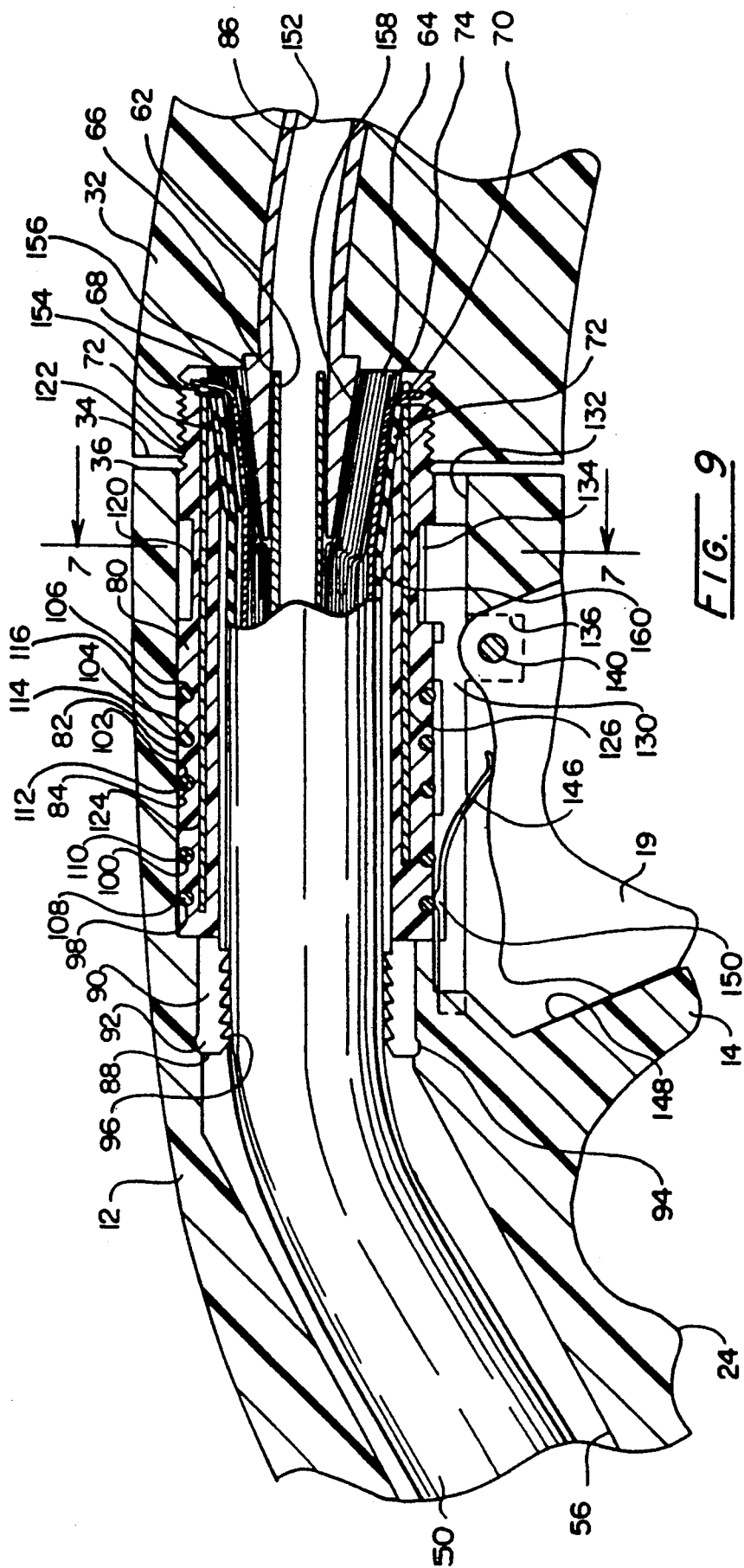

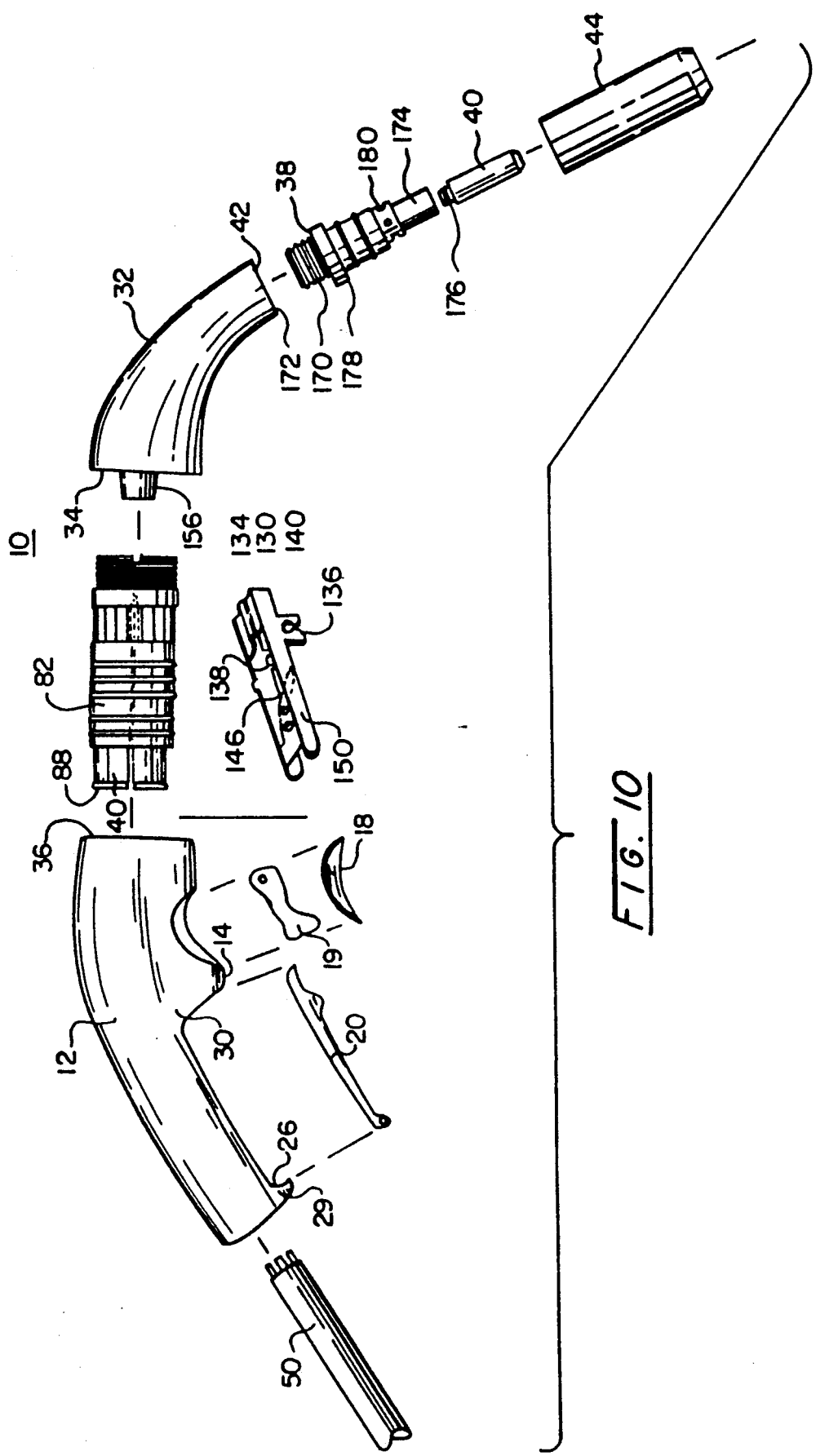

GUN FOR GAS METAL ARC WELDING

This is a continuation of application Ser. No. 07/698,123 filed on May 10, 1991 now U.S. Pat. No. 5,132,513.

BACKGROUND OF THE INVENTION

Historically, a gas metal arc welding apparatus consisted principally of a welding machine which provided a source of an electric current to an electrical welding circuit One side of the circuit was connected to a clamp, preferably spring loaded, which held a consumable metal wire electrode and was adapted to be held by an operator and the other side of the circuit was connected to the work piece to be welded. The outer surface of the electrode was covered with a flux which emitted an inert gas to prevent oxidation in the welding zone during the welding process when the electrode was heated. In operation the operator held the clamp and struck an arc between the electrode and the work piece to initiate the welding process. When the electrode was consumed the operator had to discontinue the welding process and insert another electrode into the clamp.

More recently, welding guns have been developed for use by operators as substitutes for the clamps having consumable electrodes which must be replaced frequently Wire feeders used in conjunction with the welding guns provide a continuous source of consumable steel wire electrode to the welding gun. The wire electrode may pass from the feeder to the gun through a Bowden wire contained in a conduit connected to the welding gun. The conduit also may have a tube for providing a source of pressurized inert gas to the welding gun, a conductor for providing a current source from a welding machine to the gun and one or more pairs of control wires. A typical welding gun may have a handle with a switch connected to one or more pairs of control wires to enable the operator to operate a welding machine, a wire feeder and a gas solenoid to thereby control the feed of a wire electrode and the flow of gas to a work piece. Normally such a welding gun has an adapter with a contact tip at the front end of the gun through which the wire electrode exits to the work piece. This contact tip further functions to conduct current supplied by a welding machine to the electrode as the wire is fed through it. In most instances different sizes of contact tips may be attached to an adapter in order to accommodate different sizes of wire electrode. A nozzle attached to the adapter directs inert gas to the welding site.

Typically, a conduit which connects a welding gun to an electric current generating welding machine, a source of inert gas and a wire feeder is constructed as a concentric cable assembly. This assembly may have a resilient central gas tube, a multiple strand current transfer wire wound around the outer surface of the gas tube and at least one pair of control wire conductors entwined within the current transfer wire. A Bowden wire assembly for the wire electrode may be positioned within the gas tube. A resilient outer sheath overlies the outer surface of the current transfer wire and functions as an insulator.

One disadvantage of prior art welding machines resides in the fact that they are not ergonomically designed. As an example, in some machines the cable assembly is connected to the welding gun in such a fashion that the electrical connection for the current transfer cable is located at the rear end of the gun. This design necessitates the use of a strain relief at this end of the gun. With a strain relief the weight of a conduit containing the cable coming up to the gun from a floor is cantilevered outwardly some distance from the rear end of the gun. This results in a downwardly acting force some distance from the end of the gun which acts to make the front end of the gun pivot upwardly in the hand of an operator. Thus, the operator constantly must exert a counter rotating force on the gun during the entire time it is in his hand.

Additionally, the traditional welding gun design best accommodates a work piece positioned such that the operator can work with the welding gun above the piece with the contact tip at the front end of the gun from which the welding electrode emanates pointed downwardly. If a work piece or surface to be welded requires the contact tip of the gun to be rotated to either side of a vertically downwardly orientation the operator must twist his wrist in order to grip the welding gun handle properly. It has been learned that operators who utilize welding guns over a long period of time tend to exhibit some degree of carpal tunnel syndrome in the joint of the wrist which holds the welding gun. It has been surmised that the syndrome arises as a result of the strain exerted on the operator s wrist as he acts to counterbalance the torque exerted on the gun by the cable coming up from the floor to the strain relief at the rear of the gun and by the strain exerted on the wrist when he must rotate his wrist to angle the contact tip at the front of the gun to different angular positions. Some welding guns are constructed such that a head tube which carries the adapter and contact tip may be rotated to position the contact tip at different angles with respect to the front of the gun. However, in order to rotate the contact tip the connection to a current transfer wire must be loosened, the contact tip assembly rotated and the electrical connection again re-established. Such a procedure requires the use of tools and is time-consuming and inconvenient.

An additional disadvantage of traditional welding guns relates to the mechanical connection of the concentric cable assembly to the gun. One type of connection for the attachment of the current conducting cable to a head tube at the front end of the gun which conducts current to the adapter and contact tip assembly utilizes a conical connector threadably attached to a locking cone nut. The conical connector/cone nut connector requires that the end of the outer sheath of the conduit be stripped and removed to expose the wound multiple strand current transfer wire. This wire must be distributed evenly around the outer surface of the conical connection. Additionally, the ends of the multiple strand wire must be trimmed to the proper length to ensure that they do not interfere with the threaded portion of the connector and cone nut. Thereafter, the locking cone nut must be screwed onto the conical connector such that the current transfer wire strands are squeezed between the outer surface of the conical connector and the inner surface of the cone nut. Inasmuch as the conical connector/cone nut assembly is constructed from metal components the assembly must be insulated carefully as it conducts substantial amounts of current during the welding operation. Making the connection of the current transfer wire to the head tube in this manner requires a substantial period of time.

Another type of connection for the attachment of the current conducting cable to a head tube utilizes a brass connecting lug. In this assembly the metal head tube is inserted into an opening in the brass connecting lug and the gas tube from the concentric cable assembly is fed directly into the head tube. The outer sheath is stripped from the cable assembly and the multiple strands of current transfer wire are twisted together to form a pigtail which is inserted into the opening in the brass connecting lug parallel to and beneath the head tube. A plurality of set screws are threaded into the connecting lug above the head tube to bias the metal head tube against the current transfer wire such that the wire pigtail is squeezed between the head tube and the inner wall of the connecting lug. Because the brass connecting lug is made out of metal the lug must be completely insulated and care taken to ensure that the operator's hand does not contact the lug. This connection utilizes an expensive metal lug and requires a substantial amount of time to make because of the preparation involved.

The welding gun of the present invention overcomes many of the disadvantages inherent in the design of traditional welding guns. This welding gun has an ergonomic design which positions the connection of the concentric cable assembly to the head tube at the front end of the gun. The mechanical connection of the concentric cable assembly is made in such a way that the outer sheath of the cable is not disturbed. In fact, the outer sheath assists in making the electrical connection. Additionally, non-conductive, non-metallic elements are utilized to attach the head tube which conducts current to an adapter/contact tip assembly to the multiple strand current transfer wire. This connection greatly reduces the likelihood that an operator's hand will contact any of the components within the welding gun are electrically charged during the welding operation.

Additionally, the welding gun of the instant invention has a handle which overlies the connection of the multiple strand current transfer wire to the head tube. This causes the weight of the cable assembly between the floor and the rear of the gun to be balanced by the head tube and an adapter/contact tip assembly at the front of the gun. Consequently, the operator does not have to continuously counterbalance a large downwardly acting force at the rear end of the gun. Additionally, the design of the welding gun of the present invention allows the handle of the gun to pivot freely with respect to the head tube and the adapter/contact tip assembly. Rotation of the handle with respect to this assembly may be accomplished at any time by the operator without disturbing any electrical connection and without disassembling any of the components of the gun. Thus, an operator readily may position the adapter/contact tip assembly of the gun at any desired angle with respect to the handle to position optimally the contact tip while allowing his hand to remain in the most comfortable position.

SUMMARY OF THE INVENTION

A welding gun for gas metal arc welding has a handle with a top surface, a bottom surface, or front end, a rear end and a longitudinally extending internal passageway which extends between the front end and the rear end. A gooseneck shaft having a longitudinal bore is rotatably mounted within the internal passageway of the handle to enable the handle to rotate about the outer surface of the gooseneck shaft. A gooseneck mounting and adapter and a contact tip at one end and having an internal head tube is attached to the gooseneck shaft.

DESCRIPTION OF THE DRAWINGS

FIG. 1 is a perspective view of the assembled welding gun of the present invention;

FIG. 2 is a side view of the welding gun;

FIG. 3 is a bottom view of the welding gun;

FIG. 9 is an enlarged sectional view of the connection of the concentric cable assembly to the head tube of the welding gun; and FIG. 10 is an exploded view of the welding gun.

DESCRIPTION OF THE PREFERRED EMBODIMENT

Figure 4:
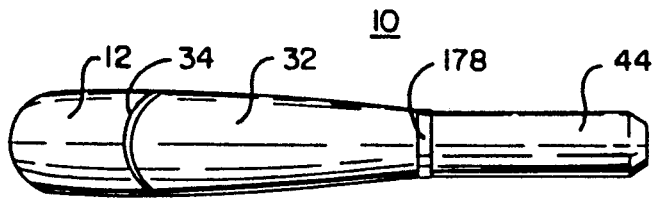
FIG. 4 is a plan view of the front end of the welding gun.
Figure 5:
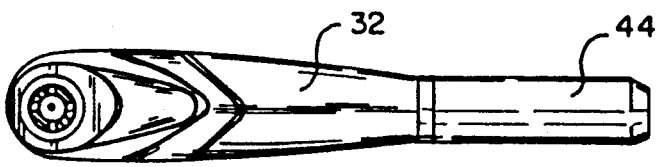
FIG. 5 is a bottom view of the welding gun showing in cross-section the connection of a concentric cable assembly to the rear end of the gun.
Figure 6:
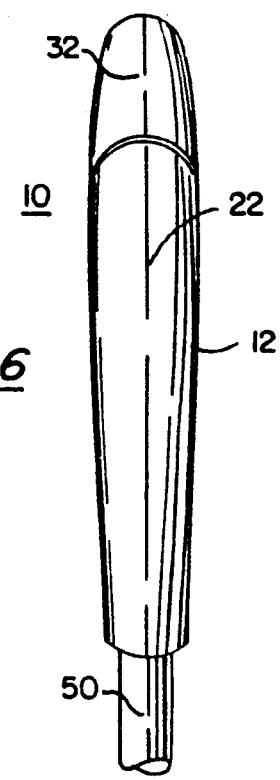
FIG. 6 is a plan view of the rear end of the welding gun.

Turning to FIGS. 1 through 6 of the drawings, it may be observed that the welding gun (10) of the present invention has a curved handle (12) adapted to be gripped by the hand of an operator. A centrally positioned trigger guard (14) projects from the bottom (16) of the handle (12). A trigger mask (18) which overlies a trigger (19) mounts in the bottom of handle (12) above trigger guard (14) and a detachable hand grip (20) fits into the bottom (16) of handle (12) below trigger guard (14). When an operator grasps the welding gun (10) in his hand, the palm of his hand rests on the top (22) of handle (12) such that his forefinger wraps around the trigger mask (18) and his thumb engages one side of trigger guard (14). The index finger of the operator's hand wraps around the detachable hand grip (20) between a protrusion (24) which projects outwardly from the hand grip (20) and the trigger guard (14). The ring and little fingers of the operator's hand wrap around the hand grip (20) between protrusion (24) and the rear end (29) of the handle (12). The curved handle (12), the detachable hand grip (20) and trigger mask (18) are manufactured from a non-conductive, heat insulative material such as glass filled nylon or plastic. Hand grip (20) fits into a cavity (26) formed in a protrusion (28) at the rear or inner end (29) of handle (12) and into a cavity (30) formed in trigger guard (14).

A curved gooseneck (32) also formed from a non-conductive, heat insulative material such as glass filled nylon or plastic has an enlarged inner end (34) which connects to the outer end (36) of handle (12). Gooseneck (32) contains a head tube (86) which projects into handle (12). A tip adapter (38) which mounts a contact tip (40) and will be explained in more detail hereinbelow threadably engages the outer end (42) of curved gooseneck (32). A metal nozzle (44) overlies adapter (38).

Turning to FIG. 2 of the drawings, it may be observed that a conduit (50) enters curved handle (12) through a central opening (52) defined in the inner end (29) thereof. With the curved design of the body of welding gun (10) which includes curved handle (12) and curved gooseneck (32), the force of conduit (50) acting downwardly on the inner end (29) of handle (12)

has been minimized. Additionally, the connection of conduit (50) to the head tube (86) contained within gooseneck (32) occurs within handle (12) at the outer end thereof as illustrated in FIG. 9. This construction causes the downwardly acting force of cable (50) acting on the inner end (29) of handle (12) and on the hand of an operator gripping the handle (12) to be counter balanced by a downwardly acting force on the outer end (36) of the handle (12) exerted by the weight of gooseneck (32), tip adapter (38) and nozzle (44). Additionally, the detachable hand grip (20) mounted in handle (12) provides an ergonomically designed welding gun handle which may be held comfortably by operators having different sized hands.

Figure 7:
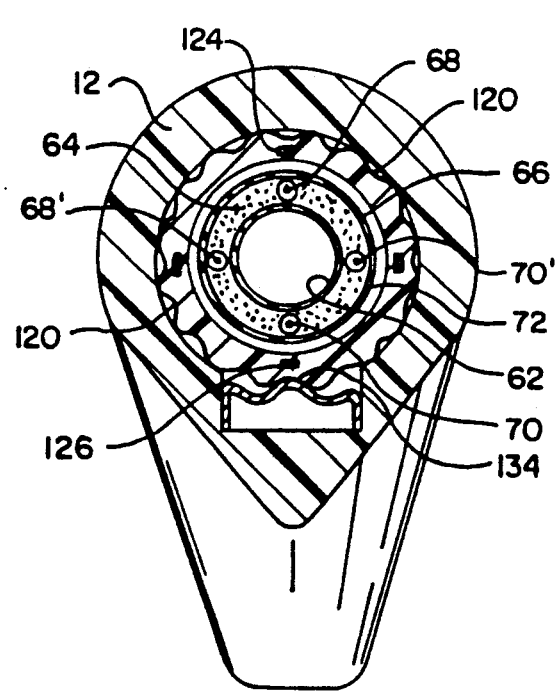
FIG. 7 is a cross-sectional view along line 7—7 of FIG. 9.

Conduit (50) which enters welding gun (10) through an opening (52) at the inner end (29) of handle (12) passes through a circular, axial, inner passage (56) formed on the inside of handle (12). The construction details of conduit (50) may be observed by referring to FIG. 7. A circular gas tube (62) which may be made of an elastomeric material forms the core of the conduit (50). Gas tube (62) provides a passage for an inert gas under pressure supplied from a source remote from welding gun (10). Although not shown, a Bowden wire assembly consisting essentially of a fixed helically wound wire sheath defining a passage way for a steel welding electrode typically resides within gas tube (62) to provide a continuous source of consumable wire electrode from a wire feeder located at a location remote from welding gun (12) to the contact tip (40). A multiple strand current transfer wire (64) overlies the outer surface (66) of gas tube (62). Current transfer wire (64) may be wound in a helix around outer surface (66). Additionally, a plurality of control wire conductors (68 and 70) and (68' and 70') may be entwined within current transfer wire (64). The control wire conductors (68, 68', 70 and 70') have insulating jackets to ensure that no electrical contact will be established between them and current transfer wire (64). The current transfer wire (64) functions to transfer electrical current generated from a welding machine located at a location remote from welding gun (10) to a head tube and an adapter and contact tip assembly and to a consumable wire electrode. The control wire conductors (68, 68', 70 and 70') function to complete a circuit between one or more switches contained within handle (12) and equipment such as a wire feeder, a solenoid for an inert gas source and/or a control for a welding machine located remote from welding gun (10). Such equipment is well known and is not shown in the drawings. An insulative, resilient outer sheath (72) fits tightly over the outer surface (74) of current transfer wire (64). Outer sheath (72) preferably is constructed of a heavy material which may be neoprene or a similar elastomeric material and which must be capable of withstanding heavy abrasion caused by dragging the conduit, resistant to stretching or breaking caused by pulling the conduit, capable of withstanding cuts and tears when the conduit engages sharp objects and capable of resisting water, grease, etc. commonly found in a shop environment.

As mentioned previously, the welding gun (10) of the present invention functions to provide a consumable metal wire welding electrode to the welding site. Additionally, the welding gun must be capable of supplying a high electrical current to the wire electrode to enable the welding operation. Preferably, the welding gun also should be capable of providing a source of inert gas to the welding site. Lastly, the welding gun should have a control mechanism for operating a wire feeder, a welding machine and/or a source of pressurized inert gas located at a site remote from that of the welding gun. The internal components of the welding gun (10) of the present invention which enable it to function as desired may be seen best by referring to FIGS. 9 and 10.

Figure 8:
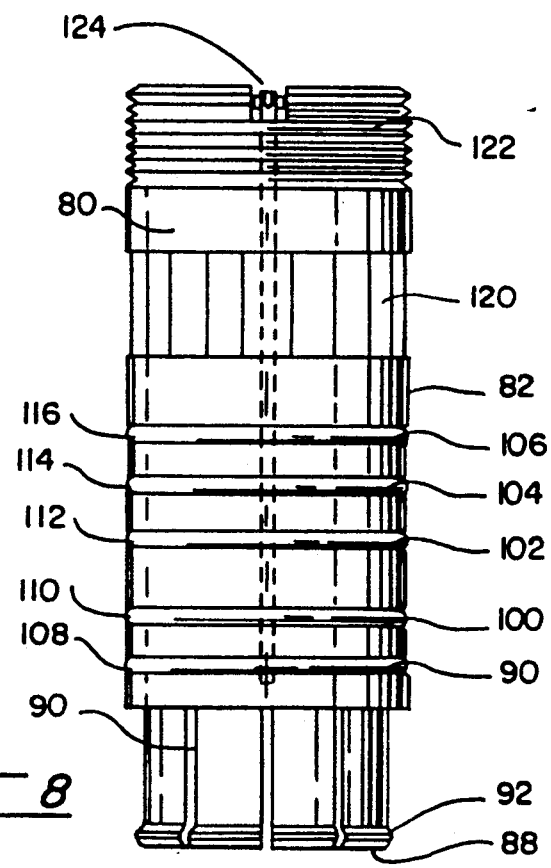
FIG. 8 is an enlarged view of the gooseneck shaft utilized in the welding gun.

A gooseneck shaft (80) is received within the outer end (36) of handle (12). The outer surface (82) of gooseneck shaft (80) is received within a complementary shaped inner surface (84) formed within the outer end (36) of handle (12). Gooseneck shaft (80) has a plurality of functions. Shaft (80) functions to grip conduit (50) to anchor it firmly in place within handle (12), it functions to enable handle (12) to be rotated about the axis of shaft (80) with respect to gooseneck body (32) and conduit (50), it functions to retain handle (12) in a set angular position, it functions to connect multi-strand current transfer wire (64) to the metal head tube (86) in gooseneck body (32) and it functions to enable a switch mechanism which will connect one or more pairs of control wire conductors (68, 68', 70 and 70') to control a welding machine, wire feeder and/or pressurized gas source as mentioned above. Gooseneck shaft (80) illustrated in detail in FIG. 8, is a unitary, generally cylindrical element made out of a non-conductive insulative material such as nylon or plastic. One end (88) of shaft (80) has a plurality of longitudinally extending fingers (90) each having an arcuate shoulder (92). The shoulders (92) are adapted to snap into a circular recess (94) formed in handle inner surface (84). Each of the shoulders (92) has a toothed gripping surface (96) formed on the inner surface thereof adapted to engage the sheath (72) o outer surface of conduit (50) when the shaft (80) has been positioned within handle (12).

The outer surface (82) of gooseneck shaft (80) has a plurality of concentric longitudinally spaced circumferential grooves (98, 100, 102, 104 and 106) shown in FIGS. 8 and 9. A plurality of metallic switch contact rings (108 through 116) are seated within these grooves. A plurality of equally spaced longitudinally extending detent grooves (120) are formed in the outer surface (82) of gooseneck shaft (80). Additionally, the outer surface (82) at the head end (122) of shaft (80) remote from the fingers (90) is threaded. Lastly, a plurality of metallic conductors (124 and 126) of which two are shown extend longitudinally through the body of gooseneck shaft (80) from the head end (122) thereof and engage switch contact rings (108 and 110) which reside within grooves (98 and 100). Conductors (124 and 126) may be connected to other conductors, not shown, by also being connected to one or more contact rings (112 through 116). Consequently, if switch contact rings (108 and 110) are connected electrically by a conductor the flat metal conductors (124 and 126) are connected electrically. It should be noted that circular contacts could be plated onto the outer surface (82) of shaft (80) in place of the contact rings (108 through 116) shown. Also longitudinally extending conductors plated onto the outer surface (82) of shaft (80) could be utilized in place of the metal conductors (124 and 126).

Turning to FIG. 9, it may be observed that when gooseneck shaft (80) has been seated within the inner surface (84) of handle (80) and the fingers (90) of shaft (80) engage the outer sheath (72) of conduit (50) there is nothing to prevent handle (12) from rotating with respect to gooseneck shaft (80). In fact, handle (12) may rotate freely about the outer surface of gooseneck shaft (80) while gooseneck body (32) remains rigidly affixed to one end thereof. As a result, handle (12) may be rotated with respect to conduit (50) and adapter (38) to enable an operator to position his hand at any angle with respect to adapter (38) and contact tip (40) during the welding operation.

A stamped metal trigger spring detent (130) shown in FIGS. 9 and 10 is positioned within a longitudinally extending groove (132) formed within handle (112) adjacent the outer end (36) thereof and rotates with handle (12). Trigger spring detent (130) functions to provide a detent element for retaining handle (12) in a set angular position with respect to gooseneck shaft (80), to provide a metal conductor element adapted to connect electrically a pair of switch contact rings (108 and 110), to provide a pivot for the trigger (19) and to provide a spring return for the trigger (19). Trigger spring detent (130) has a longitudinal shoulder (134) at the fore end thereof adapted to be seated within one of the detent grooves (120) formed in the outer surface of gooseneck shaft (80). Shoulder (134) cooperates with one of the detent grooves (120) to retain handle (12) in a set angular position with respect to shaft (80). Trigger spring detent (130) also has a pair of downwardly depending legs (136 and 138). Legs (136 and 138) have holes formed therein to enable them to receive laterally extending pivot pins (140), only one of which is shown, formed on either side of a trigger (19). Thus, trigger spring detent (130) pivotally mounts trigger (19). The trigger spring detent (130) has a downwardly depending trigger spring (146) located centrally thereof. Spring (146) functions to pivot trigger (19) counterclockwise such that trigger (19) rests against a wall (148) defined in handle (12) when the trigger (19) is not actuated.

It may be observed that one end (150) of trigger spring (146) contacts one switch contact ring (108) at all times. When trigger (19) is released and in the rest position illustrated in FIG. 9, spring (146) does not contact any other switch contact ring. However, when trigger (19) is squeezed by an operator such that it rotates clockwise about pivot pins (140), trigger spring (146) is moved into contact with switch contact ring (110). This movement establishes an electrical connection between switch contact rings (108 and 110) which in turn establishes an electrical connection between conductors (124 and 126). In this manner control wires (68 and 70) housed within conduit (50) are electrically connected to thereby operate, directly or indirectly controls for, a welding machine, a wire feeding machine and/or a source of pressurized inert gas not shown. Other pairs of control wires (68' and 70') may be connected to other conductors, not shown, within gooseneck shaft (80) which may be connected to additional pairs of switch contact rings (112 through 116 through an additional switch on handle (12) to operate these or other devices at remote locations.

It may be observed in FIG. 9 that gas tube (62) in conduit (50) extends into the cylindrical inner surface (152) of metal head tube (86). As mentioned previously, head tube (86) resides within non-conducting gooseneck body (32). In fact, head tube (86) may be cast within gooseneck body (32).

It may be seen that gooseneck body (32) has a threaded bore (154) which threadably engages the threaded head end (122) of gooseneck shaft (80). Additionally, head tube (86) has a tapered outer surface (156) which engages the inner surface (158) of the current transfer wire (64) when gooseneck body (32) is joined to gooseneck shaft (80). As the threaded connection between gooseneck body (32) and gooseneck shaft (80) is tightened, the tapered outer surface (156) of head tube (86) squeezes current transfer wire (64) against outer sheath (72). Outer sheath (72) is restrained from radial movement by being biased against the inner surface (160) of gooseneck shaft (80). It may be appreciated that the tapered outer surface (156) of head tube (86) cooperates with gooseneck shaft (80) to provide a simple tight connection between current transfer wire (64) and head tube (86). This connection requires only that the outer end of conduit (50) have a straight lateral cut. Outer sheath (72) does not have to be cut or peeled, current transfer wire (64) does not have to be braided or moved in any manner and the control wire conductors (68, 68', 70 and 70') may be connected easily to the conductors (124 and 126) in gooseneck shaft (80).

From the above, it may be seen that control handle (12) and gooseneck body (32) cooperate to provide the electrical connection between the current transfer wire (64) and head tube (86). Additionally, these elements connect the gas tube (62) to the inner surface (158) of head tube (86). Although not shown, a wire electrode which may be contained within a Bowden wire assembly also would project through inner surface (152) of head tube (86).

The adapter, tip and nozzle attached to gooseneck body (32) may be seen by referring to FIG. 10. A metal tip adapter (38) has a threaded end (170) adapted to be received within a threaded outer end (172) of head tube (86). This establishes an electrical connection between head tube (86) and adapter (38). Adapter (38) has an internally threaded end (174) which receives the threaded end (176) of contact tip (40). In this manner the current transfer wire (64) is connected with the contact tip (40). An insulator (178) overlies the outer surface of adapter (38). A tubular nozzle (44), which may be metallic, is pushed onto the outer surface of the insulator (178). Adapter (38) has a plurality of openings (180) to the inner bore thereof adjacent the internally threaded end (174) thereof. Thus, inert gas under pressure leaves adapter (38) at the base of contact tip (40). Nozzle (44) functions to direct the inert gas to the outer end of contact tip (40) to ensure that the interface between the contact tip and a work piece are surrounded by inert gas during the welding process.

Since certain changes may be made in the above-described system and apparatus without departing from the scope of the invention herein involved, it is intended that all matter contained in the description or shown in the accompany drawings shall be interpreted as illustrative and not in a limiting sense.

We claim:

1. A welding gun for gas metal arc welding which comprises:
    a handle having a top surface, a bottom surface, a front end, a rear end and a longitudinally extending internal passageway which extends between said front end and said rear end and adapted to receive one end of a flexible coaxial conduit having a resilient outer sheath which encloses a flexible gas tube and a current transfer wire;
    a cylindrical, non-conductive gooseneck shaft having a longitudinal bore adapted to receive said flexible conduit rotatably mounted within the internal passageway of said handle to enable said handle to rotate about the outer surface of said gooseneck shaft;

wherein one end of said gooseneck shaft projects beyond said front end of said handle;

a gooseneck having a non-conductive housing and an internal electrically conductive head tube with a projecting outer end which projects beyond one end of said housing;

wherein said projecting outer end of said head tube projects into said gooseneck shaft and enters said conduit in the space between said gas tube and said current transfer wire;

a contact tip;

connecting means for electrically connecting said contact tip to said head tube; and attaching means for fixedly attaching said gooseneck to said gooseneck shaft such that said projecting outer end of said head tube biases said current transfer wire against the inner surface of said gooseneck shaft.

2. The welding gun of claim 1 in which said attaching means further comprises positioning means for setting the angular position of said handle about said gooseneck shaft.

* * * * *